US012660043B2

(12) United States Patent
Fujishiro et al.

(10) Patent No.: US 12,660,043 B2
(45) Date of Patent: Jun. 16, 2026

(54) COMMUNICATION CONTROL METHOD AND USER EQUIPMENT

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 320 days.

(21) Appl. No.: 18/477,097

(22) Filed: Sep. 28, 2023

(65) Prior Publication Data

US 2024/0032148 A1      Jan. 25, 2024

Related U.S. Application Data

(63) Continuation of application No. PCT/JP2022/015025, filed on Mar. 28, 2022.

(60) Provisional application No. 63/167,234, filed on Mar. 29, 2021.

(51) Int. Cl.
*H04W 76/40* (2018.01)
*H04W 4/06* (2009.01)

(52) U.S. Cl.
CPC ............. *H04W 76/40* (2018.02); *H04W 4/06* (2013.01)

(58) Field of Classification Search
CPC ................................. H04W 76/40; H04W 4/06
See application file for complete search history.

(56) References Cited

U.S. PATENT DOCUMENTS 9,706,464 B2      7/2017   Fukuta et al.
9,883,355 B2 *    1/2018   Lee ....................... H04W 76/27

10,939,251 B2      3/2021   Fujishiro et al.
2013/0215761 A1    8/2013   Xu et al.
2016/0080996 A1    3/2016   Fukuta et al.
2018/0199163 A1 *  7/2018   Chen ..................... H04W 48/14
2018/0206080 A1    7/2018   Chen et al.
2021/0204248 A1 *  7/2021   Zhang ..................... H04W 4/06
2021/0250918 A1 *  8/2021   Liu ........................ H04L 5/0044
2022/0338291 A1 * 10/2022   Hong .................... H04L 5/0087
(Continued)

FOREIGN PATENT DOCUMENTS

WO      2014/157396 A1    10/2014
WO      2018/030305 A1     2/2018

OTHER PUBLICATIONS

Intel Corporation, "MBS MAC Layer and Group Scheduling Aspects", 3GPP TSG-RAN WG2 Meeting #113-e, R2-2100361, Electronic meeting, Jan. 25-Feb. 5, 2021, total 8 pages.
(Continued)

*Primary Examiner* — Kenny S Lin
(74) *Attorney, Agent, or Firm* — Studebaker Brackett PLLC

(57)      ABSTRACT

A communication control method according to an embodiment is a communication control method used in a mobile communication system providing a multicast broadcast service (MBS) from a base station to a user equipment. The communication control method includes, by the user equipment, specifying a broadcast session among MBS sessions in which the user equipment is interested, the broadcast session being an MBS session transmitted in a broadcast manner, and, by the user equipment, transmitting, to the base station, an MBS interest notification including identification information identifying the broadcast session specified.

8 Claims, 12 Drawing Sheets

(56) References Cited

U.S. PATENT DOCUMENTS

2023/0029146 A1 * 1/2023 Kadiri ............... H04W 36/0016
2023/0353987 A1 * 11/2023 Babaei ................ H04W 72/231

OTHER PUBLICATIONS

Vivo, "Summary for MBS Group Scheduling under Agenda Item 8.1.2.4", 3GPP TSG-RAN WG2 Meeting #113-electronic, R2-2102249, Online, Jan. 25-Feb. 5, 2021, total 8 pages.
3rd Generation Partnership Project; Technical Specification Group Radio Access Network; NR; NR and NG-RAN Overall Description; Stage 2 (Release 16); 3GPP TS 38.300 V16.3.0; Sep. 2020; pp. 1-148.
Kyocera, "Further consideration of control plane aspects for NR MBS", 3GPP TSG-RAN WG2 #113-e, R2-2100803, Online, Jan. 25-Feb. 5, 2021, total 9 pages.
Nokia, Nokia Shanghai Bell, "MBS to MBS Mobility Key Principles", 3GPP TSG-RAN WG3#110, R3-206251, E-Meeting, Nov. 2-12, 2020, total 5 pages.

* cited by examiner

|  | Delivery mode 1 | Delivery mode 2 |
|---|---|---|
| Intended for | *Multicast sessions*<br><br>*(High QoS requirement)* | *Broadcast sessions*<br>Multicast sessions (FFS)<br>*(Low QoS requirement)* |
| Data reception in | *Connected*<br>IDLE/INACTIVE (FFS) | *Connected*<br>*IDLE/INACTIVE*<br>   *for broadcast sessions*<br>   *for multicast sessions*<br>(FFS) |
| Configuration reception in | *Connected* | *Connected*<br>*IDLE/INACTIVE* |
| Configuration signalling by | *RRC Reconfiguration* | *BCCH and MCCH* |
| Notification by | *RRC Reconfiguration*<br>   *due to session start*<br>Not yet discussed for<br>IDLE/ INACTIVE | *MCCH change notification*<br>   *due to session start*<br>for other cases (FFS) |
| UE's interests informed by | *5GC    (MBS     session*<br>*join/leave)* | *UE    (MBS     Interest*<br>*Indication)* |

FIG. 15

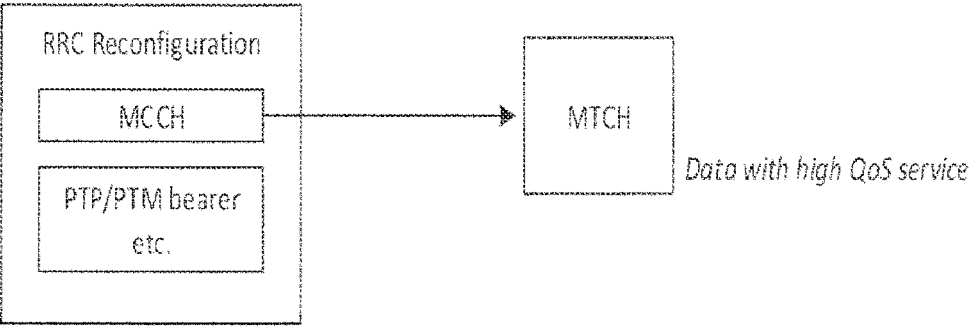

FIG. 16

COMMUNICATION CONTROL METHOD AND USER EQUIPMENT

RELATED APPLICATIONS

The present application is a continuation based on PCT Application No. PCT/JP2022/015025, filed on Mar. 28, 2022, which claims the benefit of US Provisional Patent Application No. 63/167,234 filed on Mar. 29, 2021. The content of which is incorporated by reference herein in their entirety.

TECHNICAL FIELD

The present disclosure relates to a communication control method and a user equipment used in a mobile communication system.

BACKGROUND OF INVENTION

In recent years, a mobile communication system of the fifth generation (5G) has attracted attention. New Radio (NR), which is a Radio Access Technology (RAT) of the 5G System, has features such as high speed, large capacity, high reliability, and low latency compared to Long Term Evolution (LTE), which is a fourth-generation radio access technology.

CITATION LIST

Non-Patent Literature

Non-Patent Document 1: 3GPP Technical specification "3GPP TS 38.300 V16.3.0 (2020-09)"

SUMMARY

A communication control method according to a first aspect is a communication control method used in a mobile communication system providing a multicast broadcast service (MBS) from a base station to a user equipment. The communication control method includes, by the user equipment, specifying a broadcast session among MBS sessions in which the user equipment is interested, the broadcast session being an MBS session transmitted in a broadcast manner, and, by the user equipment, transmitting, to the base station, an MBS interest notification including identification information identifying the broadcast session specified.

A communication control method according to a second aspect is a communication control method used in a mobile communication system providing a multicast broadcast service (MBS) from a base station to a user equipment. The communication control method includes, by the user equipment, performing a predetermined procedure for a multicast session with a core network device, the multicast session being an MBS session transmitted in a multicast manner, and, by the user equipment, transmitting, to the base station, a message including identification information identifying the multicast session for which the predetermined procedure has completed. The predetermined procedure is a session join procedure or a session leave procedure.

A communication control method according to a third aspect is a communication control method used in a mobile communication system providing a multicast broadcast service (MBS) from a base station to a user equipment. The communication control method includes, by the user equipment, receiving, from the base station, a stop notification indicating that the base station is to stop providing an MBS session received from the base station, by the user equipment, stopping receiving the MBS session upon reception of the stop notification, and, by the user equipment, receiving, from the base station, a restart notification indicating that the base station is to restart providing the MBS session.

A user equipment according to a fourth aspect includes a processor configured to perform the communication control method according to any one of the first aspect to the third aspect.

BRIEF DESCRIPTION OF THE DRAWINGS

FIG. 15 is a diagram illustrating an outline of agreement regarding an MBS configuration.

FIG. 16 is a diagram illustrating a structure of a Delivery mode 1 configuration.

DESCRIPTION OF EMBODIMENTS

Introduction of multicast broadcast services to the 5G system (NR) has been under study. NR multicast broadcast services are desired to provide enhanced services compared to LTE multicast broadcast services.

The present disclosure is intended to provide a communication control method and a user equipment for achieving an enhanced multicast broadcast service.

A mobile communication system according to an embodiment is described with reference to the drawings. In the description of the drawings, the same or similar parts are denoted by the same or similar reference signs.

Configuration of Mobile Communication System

Figure 1:
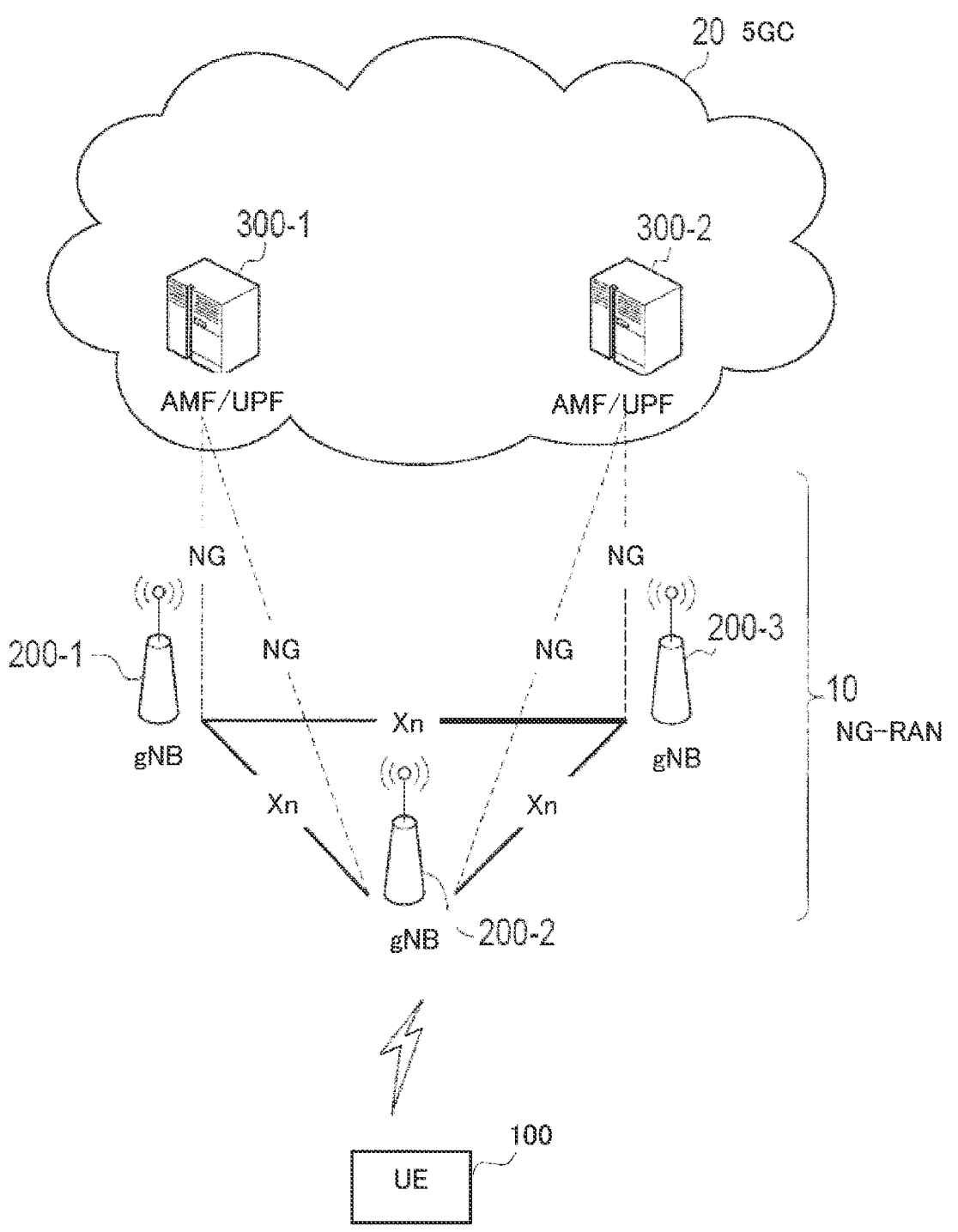
FIG. 1 is a diagram illustrating a configuration of a mobile communication system according to an embodiment.

First, a configuration of a mobile communication system according to an embodiment is described. FIG. 1 is a diagram illustrating a configuration of the mobile communication system according to an embodiment. This mobile communication system complies with the 5th Generation System (5GS) of the 3GPP standard. The description below takes the 5GS as an example, but Long Term Evolution (LTE) system may be at least partially applied to the mobile communication system. The sixth generation (6G) system may be at least partially applied to the mobile communication system.

As illustrated in FIG. 1, the mobile communication system includes a User Equipment (UE) 100, a 5G radio access network (Next Generation Radio Access Network (NG-RAN)) 10, and a 5G Core Network (5GC) 20.

The UE 100 is a mobile wireless communication apparatus. The UE 100 may be any apparatus as long as the apparatus is utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
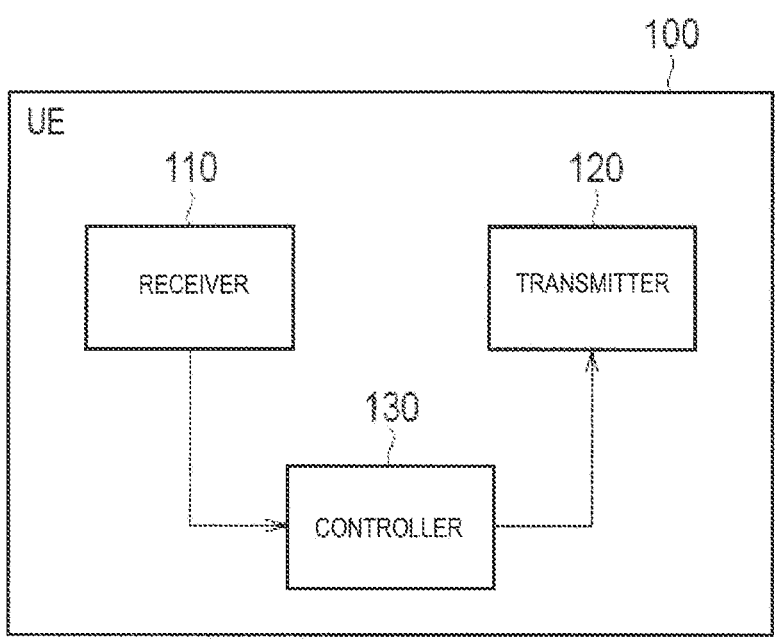
FIG. 2 is a diagram illustrating a configuration of a user equipment (UE) according to an embodiment.

FIG. 2 is a diagram illustrating a configuration of the user equipment (UE) 100 according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
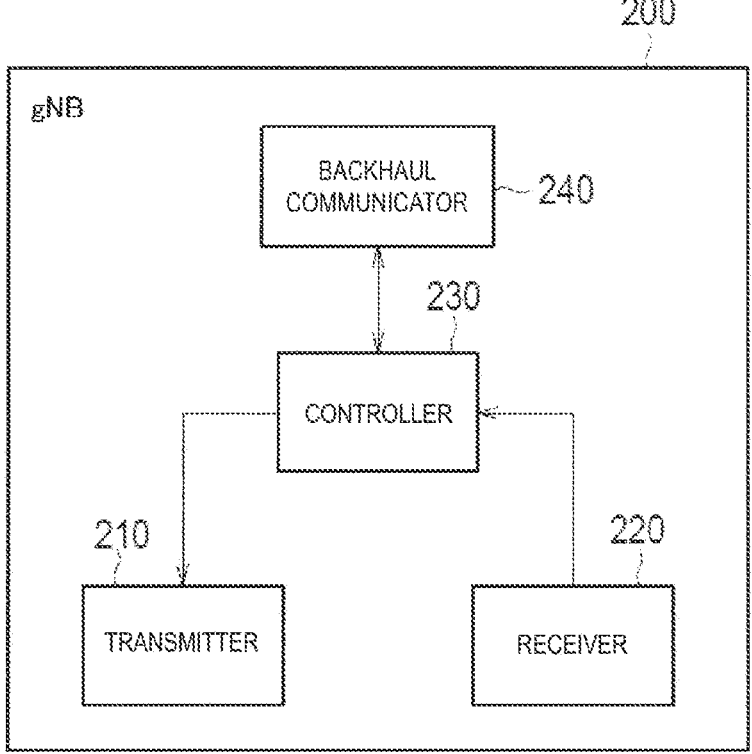
FIG. 3 is a diagram illustrating a configuration of a base station (gNB) according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
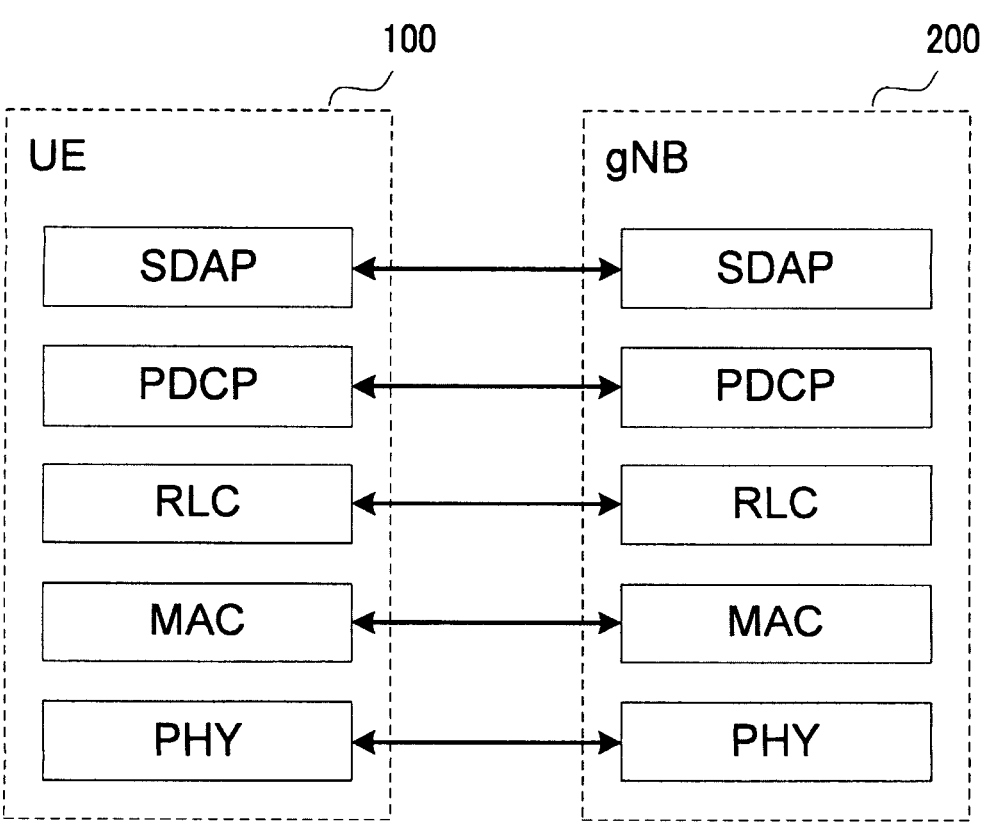
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs preferential control of data, retransmission processing using a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink, and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of Quality of Service (QoS) control performed by a core network and a radio bearer as the unit of QoS control performed by an Access Stratum (AS). Note that, when the RAN is connected to the EPC, the SDAP need not be provided.

Figure 5:
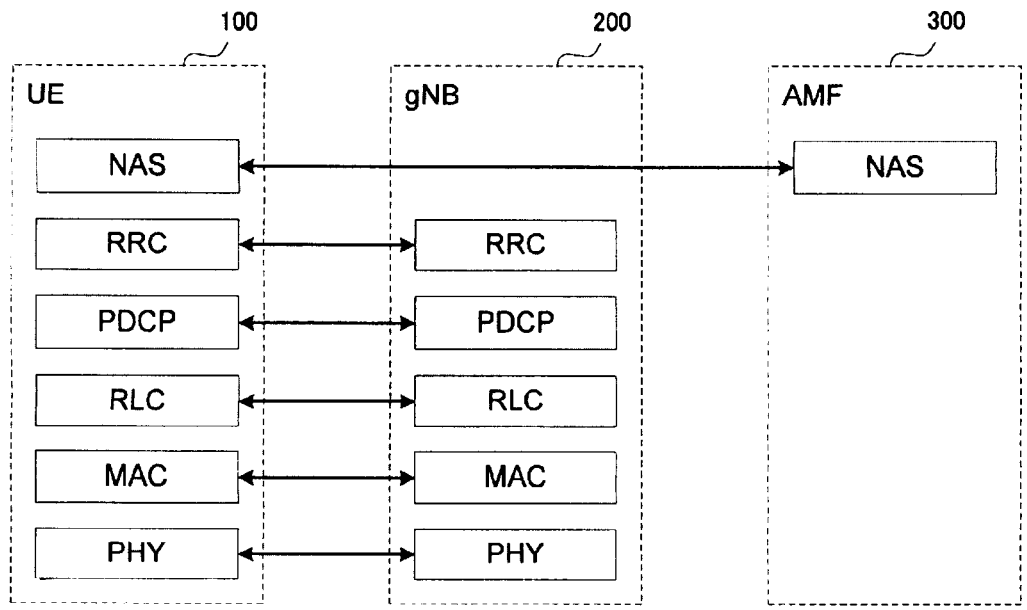
FIG. 5 is a diagram illustrating a configuration of a protocol stack of a radio interface of a control plane handling signaling (control signal).

FIG. 5 is a diagram illustrating a configuration of a protocol stack of a radio interface of a control plane handling signaling (a control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the RRC connection between the RRC of the UE 100 and the gNB 200 is suspended, the UE 100 is in an RRC inactive state.

The NAS layer which is positioned higher than the RRC layer performs session management, mobility management, and the like. NAS signaling is transmitted between the NAS layer of the UE 100 and the NAS layer of the AMF 300.

Note that the UE 100 includes an application layer other than the protocol of the radio interface.

MBS

An MBS according to an embodiment is described. The MBS is a service in which the NG-RAN 10 can provide broadcast or multicast, i.e., Point To Multipoint (PTM) data transmission to the UE 100. The MBS may be referred to as the Multimedia Broadcast and Multicast Service (MBMS). Note that use cases (service types) of the MBS include public security communication, mission critical communication, V2X (Vehicle to Everything) communication, IPv4 or IPv6 multicast delivery, Internet protocol television (IPTV), group communication, and software delivery.

Figure 6:
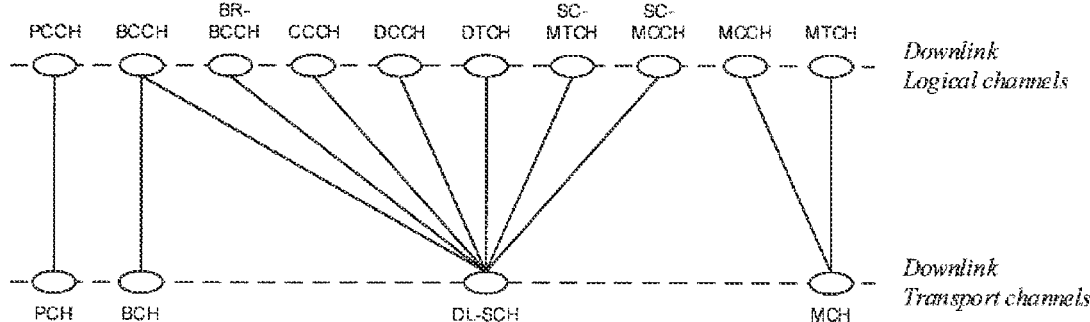
FIG. 6 is a diagram illustrating a correspondence relationship between a downlink Logical channel and a downlink Transport channel according to an embodiment.

MBS Transmission in LTE includes two schemes, i.e., a Multicast Broadcast Single Frequency Network (MBSFN) transmission and Single Cell Point-To-Multipoint (SC-PTM) transmission. FIG. 6 is a diagram illustrating a correspondence relationship between a downlink Logical channel and a downlink Transport channel according to an embodiment.

As illustrated in FIG. 6, the logical channels used for MBSFN transmission are a Multicast Traffic Channel (MTCH) and a Multicast Control Channel (MCCH), and the transport channel used for MBSFN transmission is a Multicast Control Channel (MCH). The MBSFN transmission is designed primarily for multi-cell transmission, and in an MBSFN area including a plurality of cells, each cell synchronously transmits the same signal (the same data) in the same MBSFN subframe.

The logical channels used for SC-PTM transmission are a Single Cell Multicast Traffic Channel (SC-MTCH) and a Single Cell Multicast Control Channel (SC-MCCH), and the transport channel used for SC-PTM transmission is a Downlink Shared Channel (DL-SCH). The SC-PTM transmission is primarily designed for single-cell transmission, and corresponds to broadcast or multicast data transmission on a cell-by-cell basis. The physical channels used for SC-PTM transmission are a Physical Downlink Control Channel (PDCCH) and a Physical Downlink Control Channel (PDSCH), and enables dynamic resource allocation.

Although an example will be mainly described below in which the MBS is provided using a scheme same as, and/or similar to, the SC-PTM transmission scheme, the MBS may be provided using the MBSFN transmission scheme.

MBS data refers to data provided by the MBS, an MBS control channel refers to the MCCH or SC-MCCH, and an MBS traffic channel refers to the MTCH or SC-MTCH. However, the MBS data may be transmitted in unicast. The MBS data may be referred to as MBS packets or MBS traffic.

The network can provide different MBS services for respective MBS sessions. The MBS session is identified by at least one selected from the group consisting of Temporary Mobile Group Identity (TMGI) and a session identifier, and at least one of these identifiers is referred to as MBS identification information. Such MBS identification information may be referred to as an MBS service identifier or a multicast group identifier (Group-Network Temporary Identifier (G-RNTI)).

The MBS session includes a broadcast session and a multicast session.

The broadcast session is a session for delivering a broadcast service. A broadcast service provides a service to every UE 100 within a particular service area for an application not requiring highly reliable QoS. The broadcast service is available by the UE 100 in all RRC states (RRC idle state, RRC inactive state, and RRC connected state). MBS data belonging to the broadcast session is transmitted in a broadcast manner.

The multicast session is a session for delivering a multicast service. The multicast service provides a service to a group of UEs 100 joining a multicast session for an application requiring highly reliable QoS. The multicast service is mainly available by the UE 100 in the RRC connected state. MBS data belonging to the multicast session is transmitted in a multicast manner.

Figure 7:
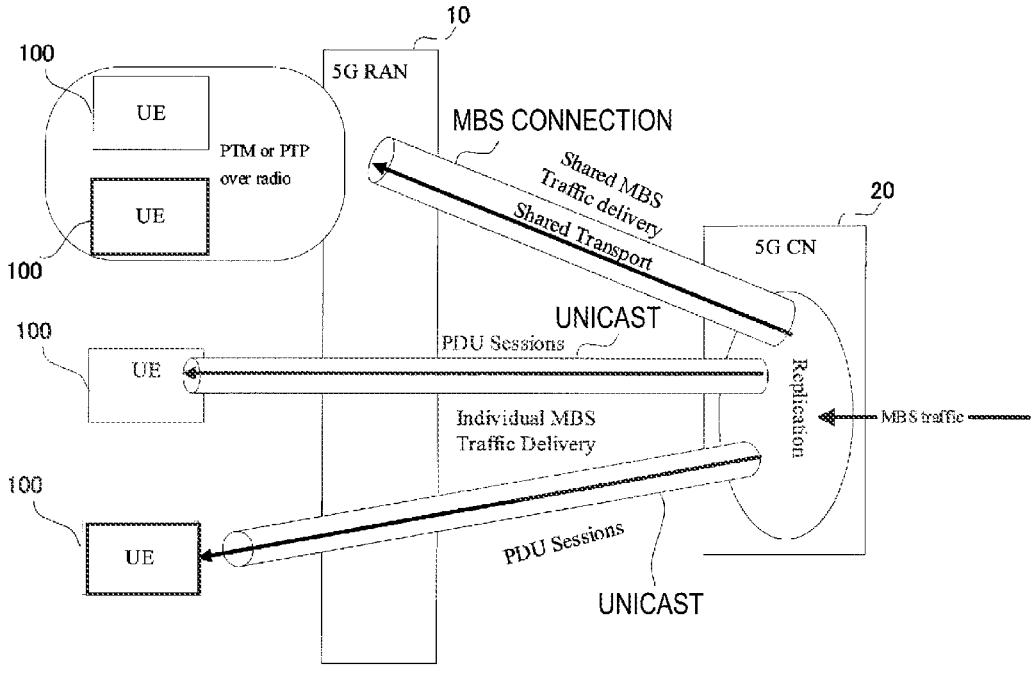
FIG. 7 is a diagram illustrating a delivery method of MBS data according to an embodiment.

FIG. 7 is a diagram illustrating a delivery method of the MBS data according to an embodiment.

As illustrated in FIG. 7, the MBS data (MBS traffic) is delivered from a single data source (application service provider) to a plurality of UEs. The 5G CN (5G) 20, which is a 5GC core network, receives the MBS data from the application service provider and performs replication of the MBS data to deliver the resultant.

From the perspective of the 5GC 20, two delivery methods are possible: shared MBS data delivery (shared MBS traffic delivery) and individual MBS data delivery (individual MBS traffic delivery).

In the shared MBS data delivery, a connection is established between the NG-RAN 10 that is a 5G radio access network (5G RAN) and the 5GC 20 to deliver the MBS data from the 5GC 20 to the NG-RAN 10. Such a connection (a tunnel) is hereinafter referred to as an "MBS connection".

The MBS connection may be referred to as a shared MBS traffic delivery connection or a shared transport. The MBS connection terminates at the NG-RAN 10 (i.e., the gNB 200).

The gNB 200 selects a transmission scheme either of Point-to-Point (PTP: unicast) or Point-to-Multipoint (PTM: multicast or broadcast) at the discretion of the gNB 200, and transmits the MBS data to the UE 100 through the selected transmission scheme.

On the other hand, in the individual MBS data delivery, a unicast session is established between the NG-RAN 10 and the UE 100 to individually deliver the MBS data from the 5GC 20 to the UE 100. Such unicast may be referred to as a PDU session. The unicast (PDU session) terminates at the UE 100.

MBS Session Join Procedure

An MBS session join procedure according to an embodiment will be described.

The UE 100 uses the MBS session join procedure to notify the core network of interest of the UE 100 in a certain MBS session. In the MBS session join procedure, the service area (service area including a plurality of cells) of an MBS session can be adjusted according to interest of each UE 100. This enables dynamic and efficient use of radio resources. The UE 100 needs to perform the MBS session join procedure in order to receive a multicast session.

Figure 8:
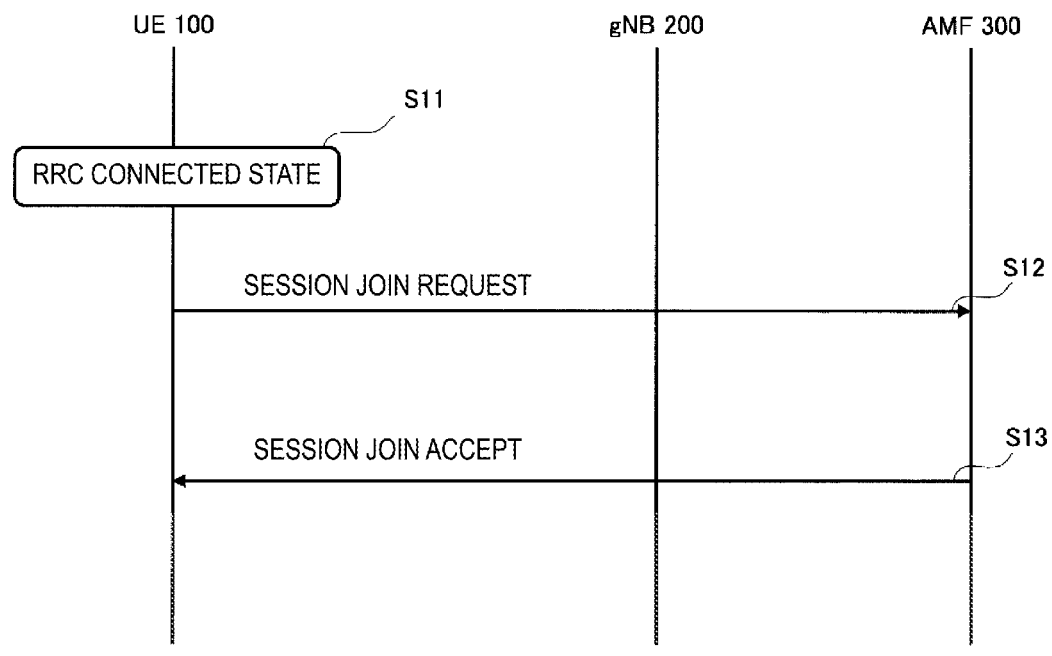
FIG. 8 is a diagram illustrating an MBS session join procedure according to an embodiment.

FIG. 8 is a diagram illustrating an MBS session join procedure according to an embodiment.

As illustrated in FIG. 8, in Step S11, the UE 100 is in the RRC connected state.

In Step S12, the UE 100 transmits a Session Join Request message to the AMF 300 (core network apparatus). The Session Join Request message includes MBS identification information identifying an MBS session in which the UE 100 is interested. The Session Join Request message is a NAS message and is transmitted to the AMF 300 via the gNB 200.

In Step S13, the AMF 300 transmits a Session Join Accept message for accepting session joining to the UE 100. The Session Join Accept message is a NAS message and is transmitted to the UE 100 via the gNB 200.

The AMF 300 may notify the gNB 200 of the MBS identification information identifying the MBS session in which the UE 100 is interested. This allows the gNB 200 to recognize the MBS session that the UE 100 is interested in receiving.

MBS Session Leave Procedure

An MBS session leave procedure according to an embodiment will be described.

The UE 100 uses an MBS session leave procedure to notify the core network that the UE 100 has lost interest in a certain MBS session. The MBS session leave procedure is required for a multicast session.

Figure 9:
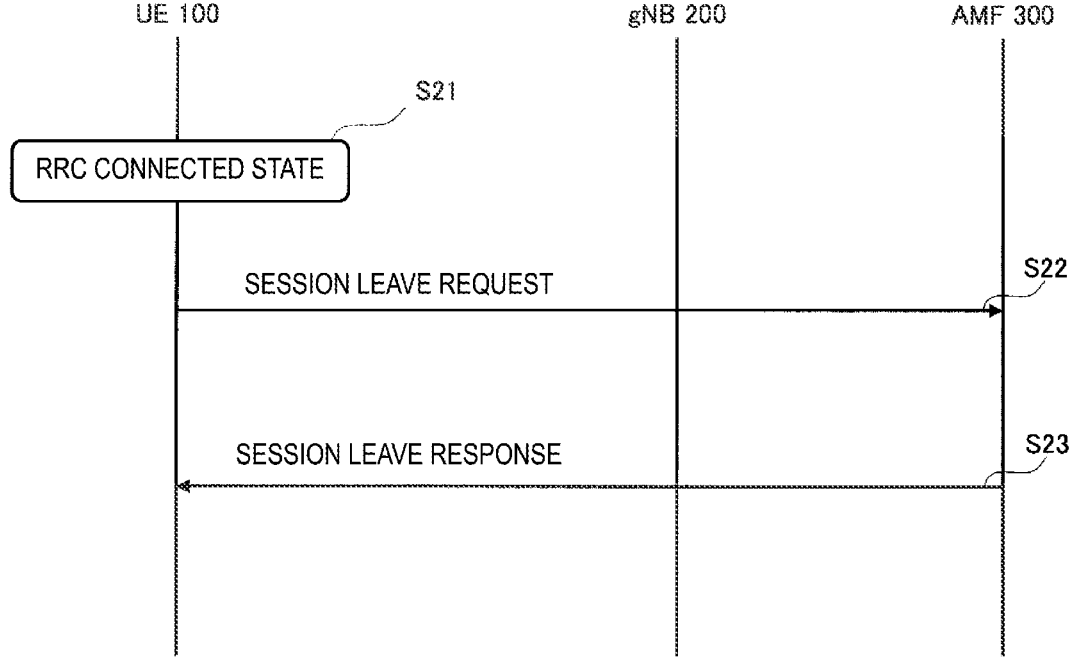
FIG. 9 is a diagram illustrating an MBS session leave procedure according to an embodiment.

FIG. 9 is a diagram illustrating an MBS session leave procedure according to an embodiment.

As illustrated in FIG. 9, in Step S21, the UE 100 is in the RRC connected state.

In Step S22, the UE 100 transmits a Session Leave Request message to the AMF 300. The Session Leave Request message includes MBS identification information identifying an MBS session in which the UE 100 has lost interest. The Session Leave Request message is a NAS message and is transmitted to the AMF 300 via the gNB 200.

In Step S23, the AMF 300 transmits a Session Leave Response message to the UE 100. The Session Leave Response message is a NAS message and is transmitted to the UE 100 via the gNB 200.

The AMF 300 may notify the gNB 200 of the MBS identification information identifying the MBS session in which the UE 100 has lost interest. This allows the gNB 200 to recognize the MBS session in which the UE 100 has lost interest.

MBS Interest Notification

An MBS interest notification according to an embodiment will be described.

In order to maintain the service continuity of an MBS, the UE 100 transmits, to the gNB 200, an MBS interest notification regarding an MBS session that the UE 100 is interested in receiving. When it is necessary to hand over the UE 100, the gNB 200 hands over the UE 100 to another gNB 200 providing the same MBS session as the MBS session that the UE 100 is interested in receiving. Thus, the service continuity of the MBS of the UE 100 can be maintained.

The MBS interest notification may be an MBS interest notification message voluntarily transmitted by the UE 100 or an information element included in this message, or may be an MBS counting response message transmitted by the UE 100 in response to a request from a gNB 200 or an information element included in this message.

Such a message (MBS interest notification) is, for example, an RRC message and includes MBS identification information identifying an MBS session in which the UE 100 is interested. The MBS interest notification may further include at least one selected from the group consisting of identification information of a QoS flow corresponding to the MBS session and identification information of a frequency at which the MBS session is provided.

First Embodiment

As described above, the AMF 300 recognizes an MBS session in which the UE 100 is interested through an MBS session join procedure. Since the MBS session join procedure is required for a multicast session, the AMF 300 recognizes the multicast session in which the UE 100 is interested. Accordingly, the gNB 200 can recognize the multicast session in which the UE 100 is interested through signaling with the AMF 300. Thus, it is less necessary to transmit MBS interest information regarding the multicast session among MBS sessions from the UE 100 to the gNB 200. In particular, in a situation where the gNB 200 already recognizes the multicast session in which the UE 100 is interested through signaling with the AMF 300, radio resources may be wastefully consumed when the UE 100 transmits the MBS interest information regarding the multicast session to the gNB 200.

The communication control method according to a first embodiment is a method used in a mobile communication system providing a multicast broadcast service (MBS) from the gNB 200 to the UE 100. The communication control method according to the first embodiment includes, by the UE 100, specifying a broadcast session among MBS sessions in which the UE 100 is interested, and, by the UE 100, transmitting, to the base station, an MBS interest notification including identification information identifying the broadcast session specified. The specifying includes, by the UE 100, specifying the broadcast session based on broadcast session identification information received from the gNB 200.

Figure 10:
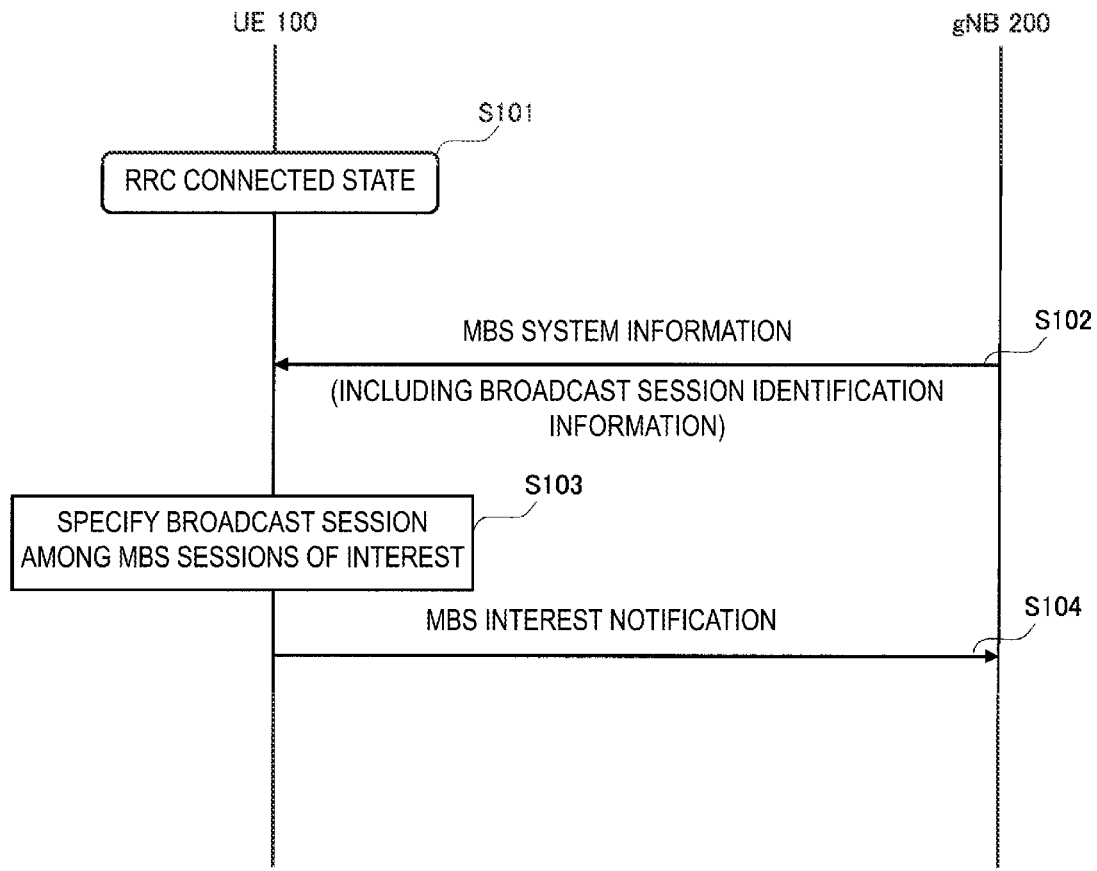
FIG. 10 is a diagram illustrating an operation example according to a first embodiment.

FIG. 10 is a diagram illustrating an operation example according to the first embodiment.

As illustrated in FIG. 10, in Step S101, the UE 100 is in the RRC connected state in a cell of the gNB 200.

In Step S102, the UE 100 receives MBS system information from the gNB 200 through a Broadcast Control Channel (BCCH). Note that the system information may be referred to as a System Information Block (SIB). The MBS system information may be transmitted in a cycle scheduled by a predetermined type of SIB (e.g., SIB Type 1) or may be transmitted in response to a request from the UE 100 (i.e., on demand).

The MBS system information includes scheduling information required for reception of an MBS control channel used in the cell managed by the gNB 200. For example, the MBS system information includes at least one selected from the group consisting of information indicating a cycle in which the contents of the MBS control channel (MBS control information) can be changed, information indicating a time interval of transmission of the MBS control channel, which is represented by the number of radio frames, information indicating an offset of a radio frame in which the MBS control channel is scheduled, and information indicating a subframe in which the MBS control channel is scheduled.

The MBS control channel carries the MBS control information. The MBS control information includes a list of scheduling information required for reception of an MBS traffic channel corresponding to the MBS session. The scheduling information includes MBS identification information identifying the MBS session corresponding to the MBS traffic channel and DRX information (or scheduling information) for the MBS traffic channel. The MBS sessions and the MBS traffic channels are associated one-to-one with each other. That is, one MBS traffic channel carries MBS data of only one MBS session.

In the first embodiment, the MBS system information includes broadcast session identification information. The broadcast session identification information is MBS identification information identifying only a broadcast session among MBS sessions. That is, the broadcast session identification information does not identify a multicast session. The broadcast session identification information may be a list of respective pieces of the MBS identification information identifying the plurality of broadcast sessions.

The broadcast session identification information included in the MBS system information identifies a broadcast session provided in the cell managed by the gNB 200. The MBS system information may further include broadcast session identification information identifying a broadcast session provided in a neighboring cell of the cell managed by the gNB 200.

In Step S103, the UE 100 specifies a broadcast session among MBS sessions in which the UE 100 is interested based on the broadcast session identification information included in the MBS system information.

Specifically, the UE 100 extracts, from among pieces of the MBS identification information identifying the MBS sessions in which the UE 100 is interested, one piece of the MBS identification information that matches the broadcast session identification information included in the MBS system information and specifies the MBS session identified by the extracted MBS identification information as a broadcast session.

In Step S104, the UE 100 transmits, to the gNB 200, an MBS interest notification including the MBS identification information identifying the broadcast session specified in Step S103.

The gNB 200 may control handover of the UE 100 based on the MBS interest notification.

In the first embodiment, the broadcast session identification information may be information identifying a broadcast session or a multicast session. Such information may be information identifying a broadcast session or a multicast session, which is associated with one or more pieces of MBS identification information.

In the first embodiment, the broadcast session identification information may be information identifying an MBS session in which transmission of the MBS interest notification is permitted (or required). Such information may be information for permitting (or requiring) transmission of the MBS interest notification, which is associated with one or more pieces of MBS identification information. In this case, the UE 100 may specify, based on the information, an MBS session in which transmission of the MBS interest notification is permitted (or required) among MBS sessions in which the UE 100 is interested and transmit the MBS interest notification inclusive of the identification information of the MBS session.

In the first embodiment, when the gNB 200 can recognize whether the UE 100 is interested in a certain MBS session through signaling with the AMF 300, the gNB 200 may identify the corresponding MBS session as a multicast session. In contrast, when the gNB 200 can recognize whether the UE 100 is interested in a certain MBS session through signaling with the AMF 300, the gNB 200 may identify the corresponding MBS session as a broadcast session. The gNB 200 may determine, according to the identification result, whether it is necessary to transmit the broadcast session identification information and/or the transmission contents.

In the first embodiment, the broadcast session identification information may be included in the MBS control information.

Variation 1 of First Embodiment

Variation 1 of the first embodiment will be described focusing on differences from the first embodiment. In Variation 1, the UE 100 specifies a broadcast session based on information received through an MBS control channel for the broadcast session.

In Variation 1 of the first embodiment, the MBS control channel is divided into two types: an MBS control channel for a broadcast session (hereinafter referred to as a Type-1 MBS control channel) and an MBS control channel for a multicast session (hereinafter referred to as a Type-2 MBS control channel).

The Type-1 MBS control channel includes scheduling information of an MBS traffic channel corresponding to a broadcast session and does not include scheduling information of an MBS traffic channel corresponding to a multicast session.

The MBS control information carried through the Type-2 MBS control channel includes scheduling information of an MBS traffic channel corresponding to only a multicast session and does not include scheduling information of an MBS traffic channel corresponding to a broadcast session.

The MBS system information includes scheduling information of each of the Type-1 MBS control channel and the Type-2 MBS control channel. The MBS system information may include an identifier (name) of each of the Type-1 MBS control channel and the Type-2 MBS control channel. Such an MBS control channel identifier may include a predetermined tag. For example, the Type-1 MBS control channel is expressed as "MCCH-broadcast", and the Type-2 MBS control channel is expressed as "MCCH-multicast". Alternatively, abstracted MBS control channel identifiers such as "MCCH-A" and "MCCH-B" may be used. In this case, information indicating which MBS control channel is the Type-1 MBS control channel and which MBS control channel is the Type-2 MBS control channel may be included in the MBS system information. Alternatively, information indicating which MBS control channel permits transmission of the MBS interest notification may be included in the MBS system information.

In Variation 1 of the first embodiment, the UE 100 recognizes, as a broadcast session, the MBS session identified by the MBS identification information included in the MBS control information received through the Type-1 MBS control channel.

In Variation 1 of the first embodiment, the gNB 200 may transmit only the Type-1 MBS control channel in the cell of the gNB 200. In this case, the gNB 200 does not transmit the Type-2 MBS control channel in the cell of the gNB 200. The UE 100 recognizes, as a broadcast session, the MBS session identified by the MBS identification information included in the MBS control information received through the MBS control channel without distinguishing the type. In this case, the scheduling information of the MBS traffic channel corresponding to the multicast session may be notified to the UE 100 through unicast RRC signaling.

In Variation 1 of the first embodiment, the Type-1 and Type-2 MBS control channels may be transmitted in association with different logical channel identifiers (LCIDs) and/or different radio network temporary identifiers (RN-TIs).

Figure 11:
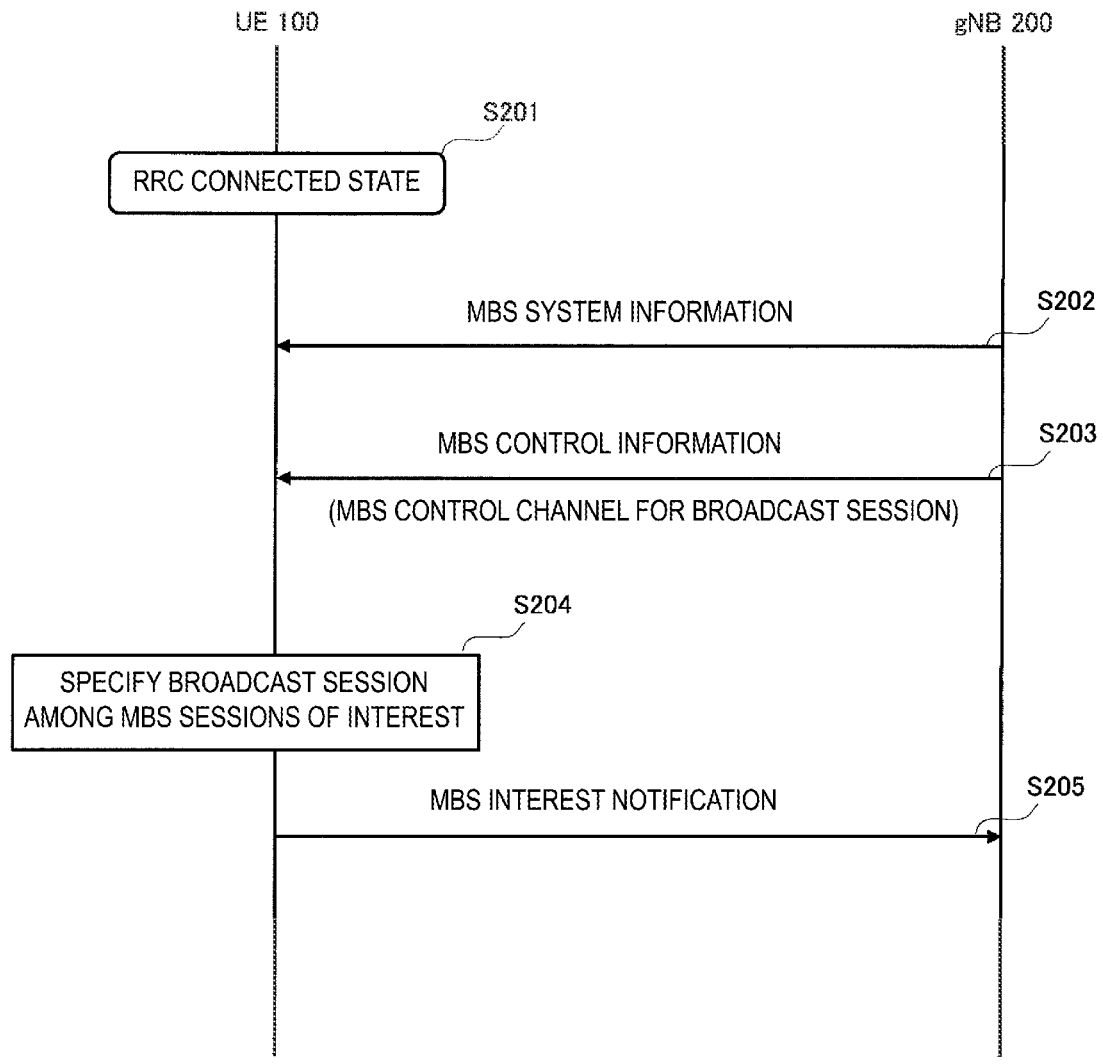
FIG. 11 is a diagram illustrating an operation example according to Variation 1 of the first embodiment.

FIG. 11 is a diagram illustrating an operation example according to Variation 1 of the first embodiment.

As illustrated in FIG. 11, in Step S201, the UE 100 is in the RRC connected state in a cell of the gNB 200.

In Step S202, the UE 100 receives MBS system information from the gNB 200.

In Step S203, the UE 100 receives a Type-1 MBS control channel (MBS control channel for a broadcast session) based on the MBS system information.

Here, the UE 100 recognizes the MBS session identified by the MBS identification information included in MBS control information received through the Type-1 MBS control channel as a broadcast session (or an MBS session permitting an MBS interest notification).

In Step S204, the UE 100 specifies a broadcast session among MBS sessions in which the UE 100 is interested. Specifically, the UE 100 extracts, from among pieces of the MBS identification information identifying the MBS sessions in which the UE 100 is interested, one of the MBS identification information that matches the MBS identification information included in the MBS control information received through the Type-1 MBS control channel and specifies the MBS session identified by the extracted MBS identification information as a broadcast session.

In Step S205, the UE 100 transmits, to the gNB 200, an MBS interest notification including the MBS identification information identifying the broadcast session specified in Step S204.

Variation 2 of First Embodiment

Variation 2 of the first embodiment will be described focusing on differences from the first embodiment. In Variation 2, the RRC layer of the UE 100 specifies a broadcast session based on identification information acquired from the NAS layer. Although the NAS layer will be described below as an example of an upper layer, the upper layer is not limited to the NAS layer and may be an application layer.

Figure 12:
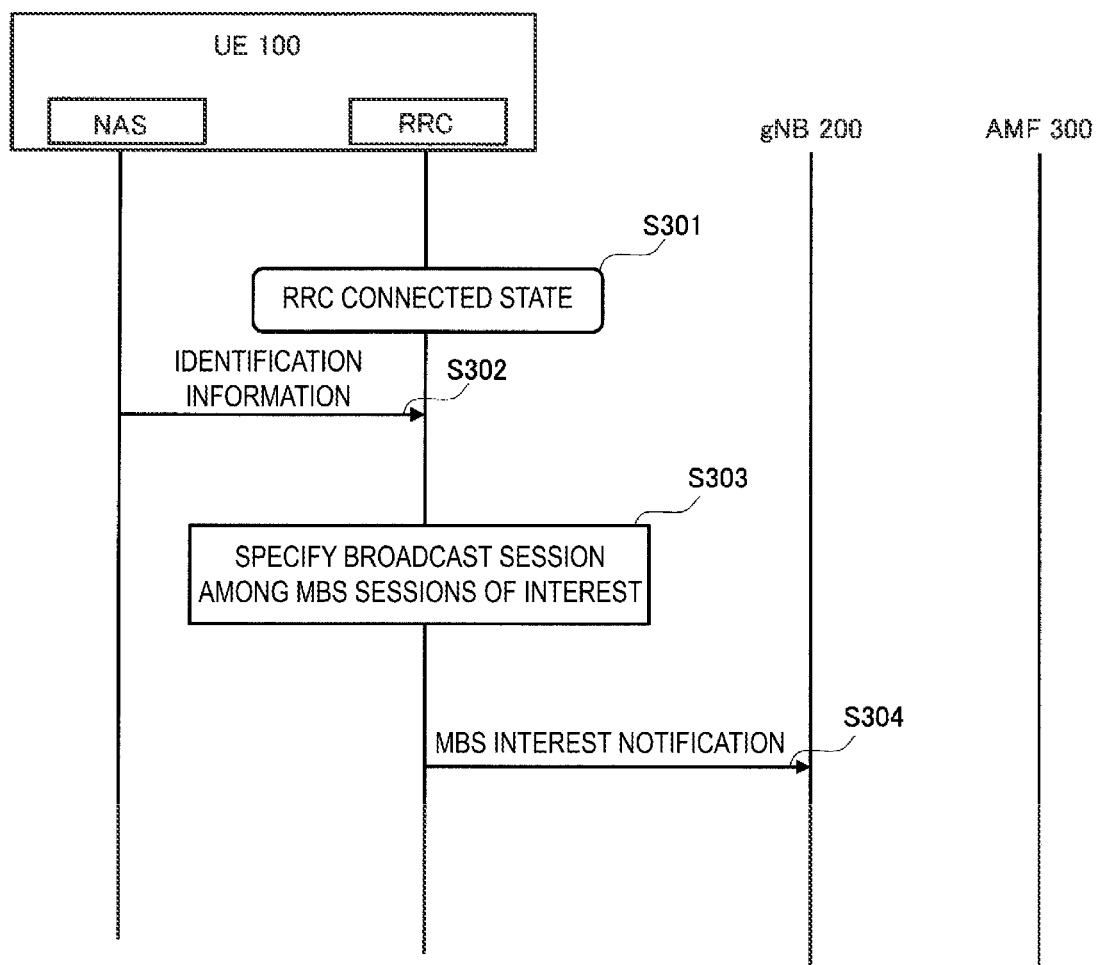
FIG. 12 is a diagram illustrating an operation example according to Variation 2 of the first embodiment.

FIG. 12 is a diagram illustrating an operation example according to Variation 2 of the first embodiment.

As illustrated in FIG. 12, in Step S301, the UE 100 is in the RRC connected state in a cell of the gNB 200.

In Step S302, the NAS layer of the UE 100 provides identification information to the RRC layer of the UE 100. The identification information identifies a broadcast session specified at the NAS layer. Here, as described above, since the MBS session join procedure is required for a multicast session, the NAS layer can specify, as a broadcast session, an MBS session not requiring the MBS session join procedure (or an MBS session for which the MBS session join procedure has not been performed/completed).

In Step S303, the RRC layer of the UE 100 specifies a broadcast session among MBS sessions in which the UE 100 is interested. Specifically, the RRC layer specifies the MBS session identified by the identification information acquired from the NAS layer in Step S302 as a broadcast session (or an MBS session requiring an MBS interest notification).

In Step S304, the RRC layer of the UE 100 transmits, to the gNB 200, an MBS interest notification including the MBS identification information identifying the broadcast session.

In Variation 2, the UE 100 may perform the MBS session join procedure before Step S301. In this case, the identification information in Step S302 identifies an MBS session for which the MBS session join procedure has completed. In Step S303, the RRC layer of the UE 100 specifies, as a broadcast session, an MBS session other than the MBS session identified by the identification information in Step S302.

Second Embodiment

A second embodiment will be described focusing on differences from the embodiment described above.

As described above, for the service continuity of an MBS, the gNB 200 can recognize a multicast session in which the UE 100 is interested through signaling with the AMF 300. However, due to congestion of the AMF 300 or the like, the gNB 200 may not be able to perform signaling with the AMF 300. Thus, the multicast session in which the UE 100 is interested may not be recognized, and the service continuity of the MBS may not be maintained.

The communication control method according to the second embodiment is a method used in a mobile communication system providing a multicast broadcast service (MBS) from the gNB 200 to the UE 100. The communication control method according to the second embodiment includes, by the UE 100, performing a predetermined procedure for a multicast session with the AMF 300, and, by the UE 100, transmitting, to the gNB 200, a message including identification information identifying the multicast session for which the predetermined procedure has completed. The predetermined procedure is a session join procedure or a session leave procedure.

Figure 13:
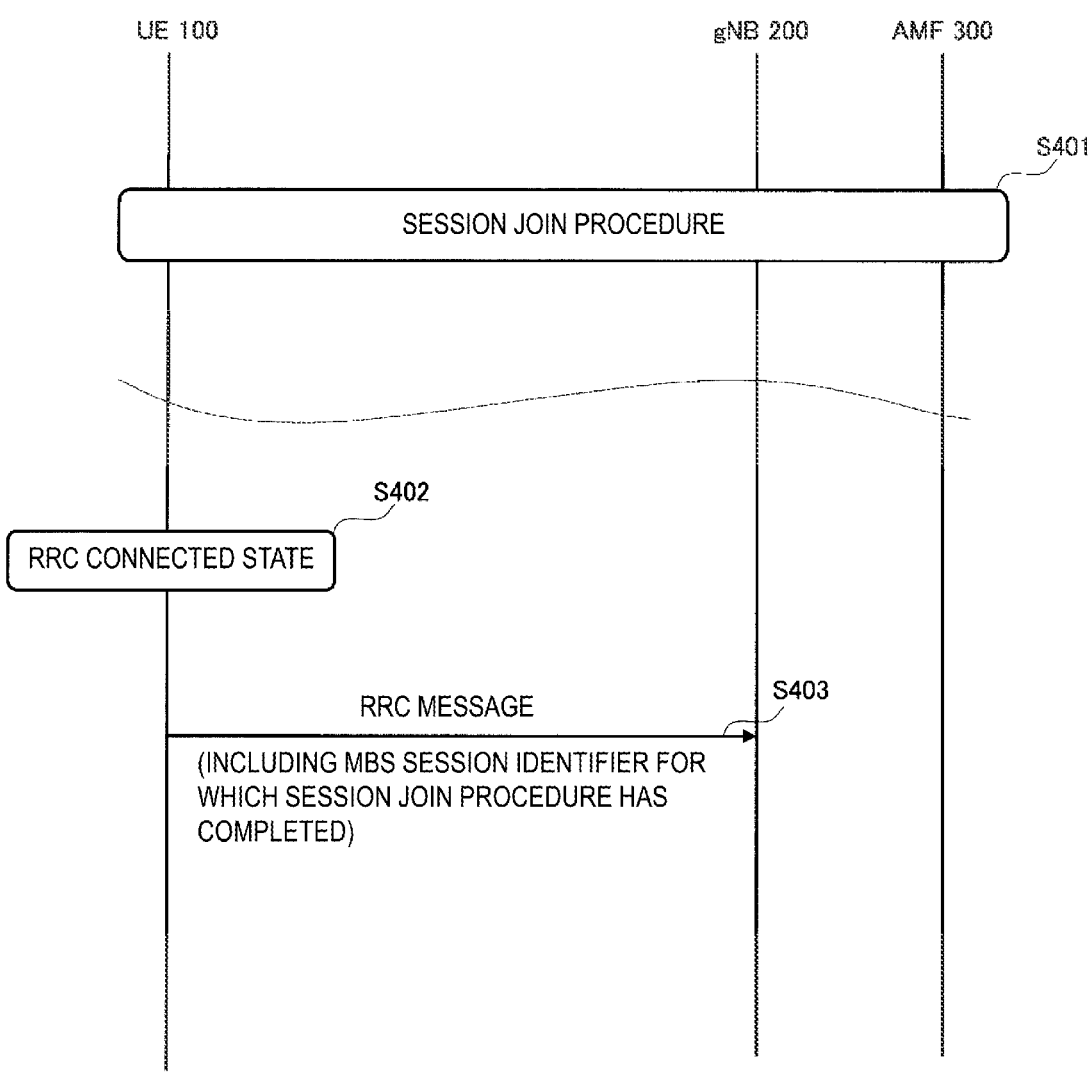
FIG. 13 is a diagram illustrating an operation example according to a second embodiment.

FIG. 13 is a diagram illustrating an operation example according to the second embodiment.

As illustrated in FIG. 13, in Step S401, the UE 100 performs an MBS session join procedure with the AMF 300. After performing the MBS session join procedure, the NAS layer of the UE 100 recognizes an MBS session for which the MBS session join procedure has completed.

After completion of the MBS session join procedure, the UE 100 may transition to the RRC inactive state or the RRC idle state.

In Step S402, the UE 100 is in the RRC connected state.

In Step S403, the UE 100 transmits, to the gNB 200, an RRC message including an MBS identifier of a multicast session for which the MBS session join procedure has completed. This allows the gNB 200 to recognize the MBS session in which in the UE 100 is interested.

In the second embodiment, the UE 100 may perform an MBS session leave procedure in Step S401. In this case, in Step S403, the UE 100 transmits, to the gNB 200, an RRC message including an MBS identifier of a multicast session for which the MBS session leave procedure has completed. This allows the gNB 200 to recognize the MBS session in which the UE 100 has lost interest.

In the second embodiment, the RRC message in Step S403 may include, for each MBS identifier, information indicating a joining status of the multicast session identified by the MBS identifier. The information indicating the joining status is information indicating that the MBS session join procedure has completed or information indicating that the MBS session leave procedure has completed.

Third Embodiment

A third embodiment will be described focusing on differences from the embodiments described above.

Provision of an MBS session may be stopped, for example, upon determination of the gNB 200 and then restarted. The scheduling information of the MBS traffic channel corresponding to the MBS session may be continuously transmitted through the MBS control channel despite that the provision of the MBS session is stopped. In this case, during the period from the stop to restart of the provision of the MBS session, the UE 100 unnecessarily continue to receive the MBS session, thereby wastefully consuming power.

The communication control method according to the third embodiment is a method used in a mobile communication system providing a multicast broadcast service (MBS) from the gNB 200 to the UE 100. The communication control method according to the third embodiment includes, by the UE 100, receiving, from the gNB 200, a stop notification indicating that the gNB 200 is to stop providing an MBS session received from the gNB 200, by the UE 100, stopping receiving the MBS session upon reception of the stop notification, and, by the UE 100, receiving, from the gNB 200, a restart notification indicating that the gNB 200 is to restart providing the MBS session.

Figure 14:
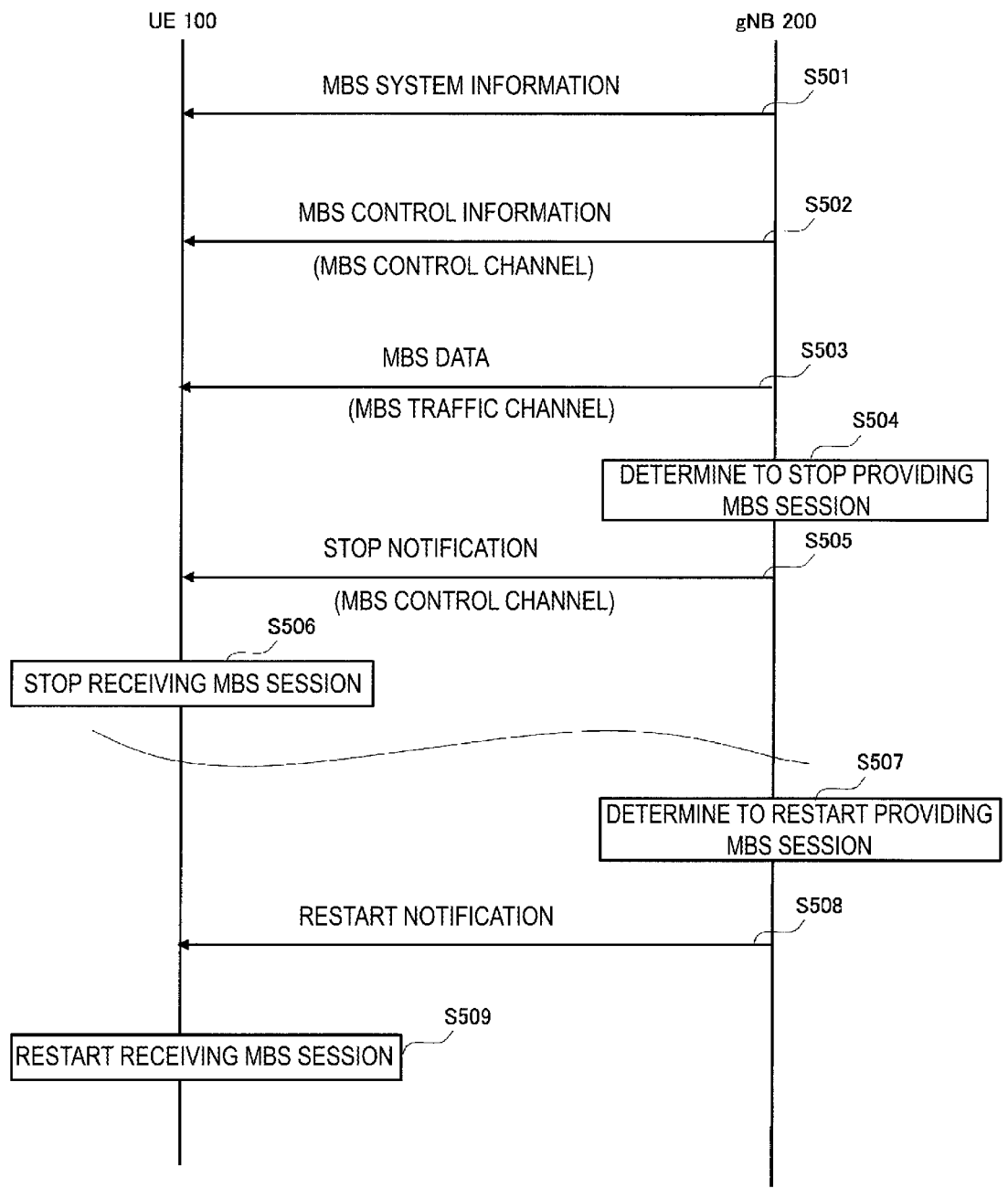
FIG. 14 is a diagram illustrating an operation example according to a third embodiment.

FIG. 14 is a diagram illustrating an operation example according to the third embodiment.

As illustrated in FIG. 14, in Step S501, the gNB 200 transmits MBS system information to the UE 100 through a broadcast control channel. The MBS system information includes scheduling information required for reception of an MBS control channel.

In Step S502, the gNB 200 transmits the MBS control channel (MBS control information) based on scheduling according to the MBS system information transmitted in Step S501. The MBS control information includes scheduling information required for reception of an MBS traffic channel corresponding to an MBS session.

The UE 100 receives the MBS control channel based on the scheduling according to the MBS system information received in Step S501.

In Step S503, the gNB 200 transmits the MBS traffic channel (MBS data) based on scheduling according to the MBS control information transmitted in Step S502. The UE 100 receives the MBS data based on the scheduling according to the MBS control information received in Step S502.

In Step S504, the gNB 200 determines to stop providing the MBS session. For example, the gNB 200 makes such a determination according to an instruction from the core network.

In Step S505, the gNB 200 transmits, to the UE 100 through the MBS control channel, a stop notification indicating stop of provision of the MBS session. At this point, the gNB 200 may continuously transmit the MBS control information transmitted in Step S502. The gNB 200 transmits the stop notification for each MBS session. That is, the stop notification is associated with the MBS session. The stop notification may be transmitted for each MBS session by using an RRC message.

In Step S506, the UE 100 stops receiving the MBS session upon reception of the stop notification.

The UE 100 stops receiving the MBS traffic channel even when receiving the MBS control information in Step S505.

The UE 100 stops receiving the MBS traffic channel even when the MBS control information is applied. For example, the UE 100 stops receiving the MBS traffic channel even during the transmission period of the MBS traffic channel scheduled based on the applied MBS control information.

In Step S507, the gNB 200 determines to restart providing the MBS session. For example, the gNB 200 makes such a determination according to an instruction from the core network.

In Step S508, the gNB 200 transmits, to the UE 100 through the MBS control channel, a restart notification indicating restart of provision of the MBS session. The gNB 200 may transmit new MBS control information together with the restart notification. For example, when the gNB 200 needs to change the scheduling of the MBS traffic channel upon restart of the MBS session, the gNB 200 transmits the new MBS control information.

In Step S509, the UE 100 restarts receiving the MBS session upon reception of the restart notification. For example, the UE 100 restarts receiving the MBS session based on the scheduling according to the already applied MBS control information (e.g., the MBS control information received in Step S502). When receiving the new MBS control information in Step S508, the UE 100 restarts receiving the MBS session based on scheduling according to the new MBS control information.

In the third embodiment, the stop notification and the restart notification each may be transmitted by using an RRC message.

In the third embodiment, the restart notification may be included in a Change Notification message. The Change Notification message is a message for notifying the UE 100 that the contents of the MBS control channel have changed.

In the third embodiment, "stop" may be read as "suspend" or "deactivate". The term "restart" may be read as "resume" or "activate".

Other Embodiments

The embodiments described above and the variations of the embodiments can not only be separately and independently implemented, but can also be implemented in combination of two or more of the embodiments.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the respective processing operations performed by the UE 100 or the gNB 200 may be integrated, and the UE 100 or the gNB 200 may be configured at least partially as a semiconductor integrated circuit (a chipset or a system on a chip (SoC)).

Embodiments have been described above in detail with reference to the drawings, but specific configurations are not limited to those described above, and various design variation can be made without departing from the gist of the present disclosure.

Supplementary Note 1

Introduction

In RAN #88, revised work items have been approved that are related to NR multicast broadcast service (MBS).

It has been agreed in RAN2 #112-e that two delivery modes of the MBS are to be introduced as follows.

In the case of Rel-17, R2 specifies the following two modes.

1: One delivery mode for high QoS (reliability, delay) requirements available in the connected state (the UE can be switched to another state when no data reception is present, but this is not determined yet).

2: One delivery mode for "low" QoS requirements. The UE can also receive data in the inactive/idle state (details are not determined yet).

R2 assumes that Delivery mode 1 is only used for multicast sessions (in the case of R17).

R2 assumes that Delivery mode 2 is used for broadcast sessions.

The applicability of Delivery mode 2 to multicast sessions needs further study.

No data: When no ongoing data is present in a multicast session, the UE can remain in the RRC connected state. Further study is needed in the other cases.

For Delivery mode 2, an overview of the MBS configuration has been additionally agreed upon as follows.

The UE receives the MBS configuration (in the case of the broadcast/Delivery mode 2) through the BCCH and/or MCCH (TBD). This can be received in the idle/inactive mode. Further study is needed for the connected mode (dependent on the UE capacity, such as a location where the service is provided). The notification mechanism is used to notify a change in the MBS control information.

In RAN2 #113-e, the details of Delivery mode 2 have been agreed upon as follows. Both the UE in the idle/inactive state and the UE in the connected mode can receive the MBS service transmitted in NR MBS Delivery mode 2 (broadcast service already agreed upon, others undetermined). Whether the UE in the connected mode can receive this depends on the network provisioning of the service (e.g., which frequency), the configuration of the UE connected mode, and the function of the UE.

The two-step based approach (BCCH and MCCH) adopted by the LTE SC-PTM is reused to transmit the PTM configuration in NR MBS Delivery mode 2.

It is assumed that the PTM configuration of NR MBS Delivery mode 2, i.e., the broadcast-based method, can be received by reusing the LTE SC-PTM mechanism of the UE in the connected state.

It is assumed that the MCCH change notification mechanism is used to notify the MCCH configuration change due to session start in NR MBS Delivery mode 2 (in other cases, further study is needed).

It is assumed that the MBS interest indication is supported by the UE in the connected mode of the broadcast service (it is usually assumed that no mandatory network requirement exists and the network action depends on the network).

The MBS interest indication is not supported by the UE in the idle/inactive mode in NRMBS Delivery mode 2.

For the purpose of service continuity, it is assumed that some pieces of information can be provided for NR MBS Delivery Mode 2 (further study is needed and, for example, reconsideration is needed based on the progress of other groups, e.g., USD and SAI/TMGI).

Whether to support the UE recognition of the MBS service on a frequency basis for the service continuity in NR MBS Delivery mode 2 needs further study (i.e., reuse of the LTE SC-PTM mechanism).

The support of frequency prioritization during cell reselection for the service continuity in NR MBS Delivery mode 2 needs further study (i.e., reuse of the LTE SC-PTM mechanism).

P2: Whether the UE receiving multicast data can be released to the RRC inactive/idle state and continue receiving the multicast data is postponed. In future discussion, the RRC needs to be limited to the inactive state.

Supplementary Note 2

In this supplementary note, the control plane aspect of the NR MBS is considered in view of the LTE eMBMS mechanism and the latest RAN2 agreement.

Discussion

At this point, according to the RAN2 agreement cited in Section 1 and the report of the LS reply to SA2, the characteristics of the two delivery modes can be summarized in FIG. 15.

Delivery Mode 1 Configuration

In Delivery mode 1, data reception in the RRC connected state is mainly considered, but the details of the configuration aspect thereof are not yet agreed upon. Considering that Delivery mode 1 is used for high QoS services, Delivery mode 1 needs to involve, for example, the PTP/PTM split bearer and/or lossless handover. Since whether these UE-specific configurations are provided through the MCCH is pointless, it is very easy that the RRC reconfiguration needs to be used for the configuration of Delivery mode 1. In the LS reply to SA2, it has been actually confirmed that the RRC reconfiguration is used for the MBS configuration and notification due to session start.

Observation 1: For Delivery mode 1, the RRC reconfiguration is used for the MBS configuration and notification due to session start.

On the other hand, the WID clearly indicates that the RRC connected state and the RRC idle/inactive state need to have the maximum commonalities in terms of the MBS configuration. However, RAN2 has agreed to separate delivery modes of multicast and broadcast sessions.

Changes are specified that are needed to enable the UE in the RRC idle/RRC inactive state to receive PTM transmission in order to maintain the maximum commonalities between the RRC connected state and the RRC idle/RRC inactive state for the PTM reception configuration.

Even when the RRC messages of these delivery modes are different, the IE and structure of the MBS configuration need to be adjusted as much as possible between the two delivery modes to achieve the purpose of the WID, as pointed out in the discussion of RAN2 #112-e. For example, the RRC reconfiguration of Delivery mode 1 includes information specific to Delivery mode 1 such as the PTP/PTM split bearer and handover related information, in addition to the MTCH scheduling information, which is a block common to Delivery mode 2. Thus, the details need further study at this point.

Proposal 1: RAN2 needs to agree to aim for the maximum commonalities between the two delivery modes from the viewpoint of the MBS configuration, for example, by using the common structure and IE.

It needs to be noted that the "MCCH" in FIG. 16 refers only to the MTCH scheduling information, i.e., the MTCH configuration associated with the MBS session information. In the case of Delivery mode 1, adjacent cell information is not necessary.

However, whether the UE can be released to the idle/inactive state when no ongoing data is present for the multicast session still needs further study. In other words, whether the UE in the idle/inactive state can receive the MBS data via Delivery mode 1 still needs further study. As agreed upon by RAN2, the baseline is premised on that the UE needs to remain in the RRC connected state for Delivery mode 1, that is, for the multicast session, which requires high QoS. However, other/exceptional cases are worth studying.

In e-mail discussions, some companies have pointed out that the network may not be able to keep all of the UEs in the connected state due to congestion. Several other companies have also pointed out that the UE does not need to always remain to be connected for the uplink inactivity, QoS requirements, and/or power consumption of the UE.

The above points may be beneficial for both the network and the UE. However, it is understood that whether/when the UE is released to the inactive state depends on the implementation of the gNB and that whether the UE is released to the idle state depends on the core network. One concern with the MBS data reception in the idle state is that when the gNB releases the UE context (typically only held in the inactive state and not held in the idle state), the controllability of the gNB may be lost. This may be inconsistent with the concept of Delivery mode 1. Thus, it is stated in the agreement of RAN2 #113-e that "it is necessary to limit the RRC to the inactive state in future discussion". Thus, RAN2 needs to agree that the UE can receive Delivery mode 1 at least in the inactive state.

Proposal 2: For Delivery mode 1, RAN2 needs to agree that the UE can receive the MBS data at least in the RRC inactive state.

When Proposal 2 can be agreed upon, it is not clear how the idle/inactive MBS configuration is provided to the UE. There are three possible options.

Option 1: RRC Reconfiguration

The UE in the idle/inactive state continues to employ the MBS configuration provided through the RRC reconfiguration. This option is simple because the UE only reuses the MBS configuration first provided for the RRC connected state. However, part of the UE operation needs to be clarified at the time of transition to the idle/inactive state and/or return to the RRC connected state (such as a method of processing the PTP/PTM split bearer configuration when the configuration is performed).

Option 2: RRC Release

The UE in the idle/inactive state employs the MBS configuration provided through the RRC release. This option seems to be simple but may not be efficient, because it is doubtful whether the MBS configuration is different from the MBS configuration previously provided through the RRC reconfiguration.

Option 3: Switching of the Delivery Mode from Mode 1 to Mode 2

The UE is switched from Delivery mode 1 to Delivery mode 2 before being released to the idle/inactive state. This option is another simple solution since Delivery mode 2 is designed to be able to receive data in all the RRC states as agreed upon by the RAN2. However, it may be expected that packet loss and delay will occur during the switching, for example, due to acquisition of the MCCH.

Each option has advantages and disadvantages, but in our view, Option 1 is slightly preferable in terms of simplicity and efficiency. RAN2 needs to describe a method of providing the UE with the Delivery mode 1 configuration for data reception in the idle/inactive state, which includes the above options but is not limited thereto.

Proposal 3: When Proposal 2 is agreed upon, RAN2 needs to discuss how the Delivery mode 1 configuration for data reception in the inactive state is provided to the UE.

Delivery Mode 2 Configuration

In the LTE SC-PTM, configurations are provided using two messages, i.e., SIB 20 and SC-MCCH. The SIB 20 provides SC-MCCH scheduling information. The SC-MCCH provides SC-MTCH scheduling information including the G-RNTI and the TMGI, and neighbor cell information. It has been agreed to reuse the same mechanism for the NR MBS.

The NR MBS is expected to support various types of use cases described in the WID. The NR MBS needs to be appropriately designed for a variety of requirements ranging from delay sensitive applications such as mission critical applications and V2X to delay tolerant applications such as IoT, in addition to the other aspects of requirements ranging from lossless applications such as software delivery to UDP type streaming such as IPTV. Some of these services may be covered by Delivery mode 2, while other services with "high QoS requirements" require Delivery mode 1. In this sense, it is beneficial for the gNB to be able to choose use of Delivery mode 2 for multicast sessions.

This problem has been left for further study from RAN2 #112-e to RAN2 #113-e, but in general there seems to be no technical reason to impose limitations from our point of view.

Proposal 4: RAN2 needs to agree that Delivery mode 2 can be used for multicast sessions in addition to broadcast sessions.

The control channel in Delivery mode 2 needs to be designed in consideration of the flexibility and resource efficiency of the control channel in view of Proposal 4. Otherwise, for example, when a delay tolerant service and a delay sensitive service are configured together in one control channel, more signaling overhead may occur. This requires the control channel to be scheduled frequently in order to meet the delay requirements from the delay sensitive service.

An object A of the SA2 SI relates to enabling of general MBS services via 5GS, and specified use cases capable of benefiting from this function include (but are not limited to) public safety, mission critical cases, V2X applications, transparent IPv4/IPv6 multicast delivery, and IPTV, and include software delivery through wireless communications, group communications, and via IoT applications.

Observation 2: The control channel for Delivery mode 2 needs to be flexible and resource efficient with respect to various types of use cases.

Figure 17:
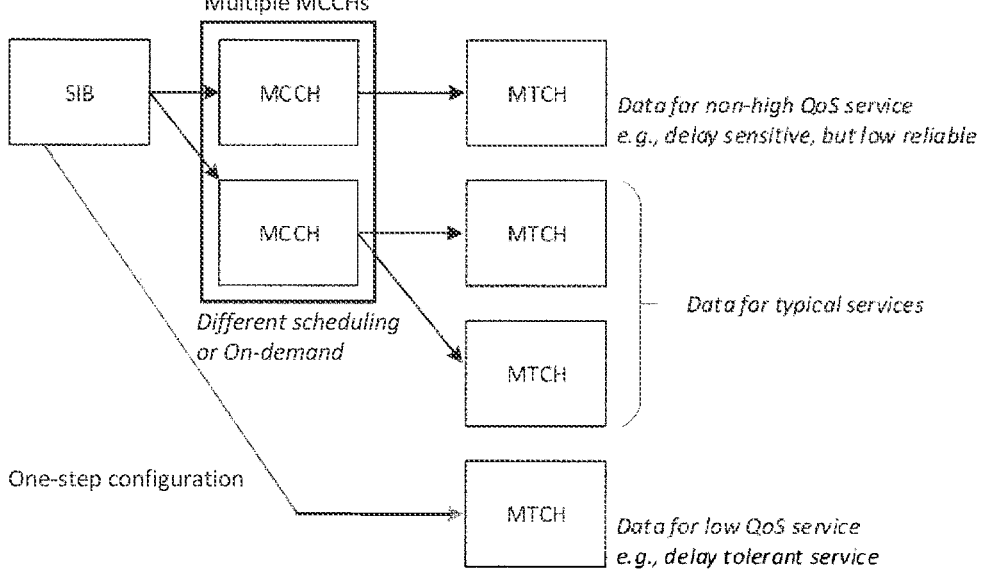
FIG. 17 is a diagram illustrating a structure of a Delivery mode 2 configuration.

One possibility is to study whether configuration channels need to be separated in different use cases, as illustrated in FIG. 17. For example, one MCCH frequently provides a delay sensitive service, and another MCCH infrequently provides a delay tolerant service. The LTE SC-PTM is limited in that one cell includes only one SC-MCCH. However, considering that more use cases are assumed in NR MBS Delivery mode 2 than LTE, such limitation needs to be eliminated. When a plurality of MCCHs are allowed within a cell, each MCCH includes a different scheduling configuration such as a repetition period which can be optimized for a specific service. A method in which the UE identifies the MCCH providing a service to a target service needs further study.

Proposal 5: For Delivery mode 2, RAN2 needs to consider whether the plurality of MCCHs not supported in LTE are supported in a cell.

A new paradigm of NR is support for on-demand SI transmission. This concept may be reused for the MCCH in Delivery mode 2, i.e., on-demand MCCH. For example, the MCCH for delay tolerant services is provided on demand, thus enabling optimization of resource consumption for signaling. Naturally, the network includes another option for providing the MCCH periodically. That is, it is not on-demand, such as delay sensitive services.

Proposal 6: For Delivery mode 2, RAN2 needs to discuss an option when the MCCH is provided on demand, which is not supported by LTE.

As another possibility, merging these messages, i.e., one-step configuration as illustrated in FIG. 17, may be studied further. For example, the SIB provides MTCH scheduling information directly, i.e., without the MCCH. Delay tolerant services and optimization of power-sensitive UEs are provided. For example, the UE can request the SIB (on demand), and the gNB can start providing the SIB and the corresponding service after requests from the plurality of UEs. These UEs do not need to monitor the repeatedly broadcast MCCH.

Proposal 7: For Delivery mode 2, RAN2 needs to discuss an option when multicast reception without the MCCH is supported (i.e., one-step configuration). For example, the SIB provides MTCH scheduling information directly.

Introduction of the MCCH change notification has been agreed upon. This is assumed to be the same as, and/or similar to, notification of the LTE SC-PTM. Through at least session start, the UE is notified of the MCCH change.

According to the latest LTE specifications, the SC-MCCH change notification is notification in which "regarding a change of the first subframe available for the SC-MCCH transmission in the repetition period, a UE other than a BL UE, a UE in a CE, or a NB-IoT UE is notified of the change when the network changes (part of) the SC-MCCH information", and it may be interpreted that the SC-MCCH change notification does not need to be limited to some extent at session start.

When no MCCH change notification is provided during the MBS session, the UE needs to always decode the MCCH at every MCCH change boundary to check whether MCCH is updated. This is inefficient in terms of UE power consumption, compared to the case of decoding only the MCCH change notification. Thus, the MCCH change notification needs to be provided not only at the session start but also whenever the configuration is changed.

Proposal 8: For Delivery mode 2, RAN2 needs to discuss whether the MCCH change notification is provided each time the MCCH information is changed.

Interest Indication/Counting

In the LTE eMBMS, in order for the network to perform appropriate determination of MBMS data delivery including MBMS session start/stop, two types of methods of collecting a service that the UE is receiving/interested in are specified, i.e., the MBMS interest indication (MII) and MBMS counting. The MII triggered by the UE includes information related to a target MBMS frequency, a target MBMS service, an MBMS priority, and an MBMS reception-only mode (ROM). A counting response triggered by the network via a counting request for a specific MBMS service includes information related to a target MBSFN area and a target MBMS service.

These methods have been introduced for various purposes. The MII is mainly used by the network to enable the UE to continue to receive the target service during connection. In contrast, the counting is used to enable the network to determine whether a sufficient number of UEs are interested in receiving the service.

Observation 3: In the LTE eMBMS, two types of UE assistance information are introduced for different purposes. The MBMS interest indication for eNB scheduling, and the MBMS counting for session control of the MCE are introduced.

For the NR MBS, the MBS interest indication is agreed to be supported in the RRC connected state but not in the idle/inactive state. Based on this, it is worthwhile to study function enhancement, in addition to the LTE eMBMS. In LTE eMBMS, even when most of the UEs receive broadcast services in the RRC idle state, information of neither MII nor counting can be collected from the UEs in the idle state. To our understanding, this is one remaining problem that the LTE eMBMS has from the viewpoint of session control and resource efficiency.

In the NR MBS, the same problem may occur in the UE in the idle/inactive state, i.e., in Delivery mode 2 of broadcast sessions. For example, the network does not recognize whether the UE in the idle/inactive state is not receiving/interested in broadcast services. Thus, the network may continue to provide PTM transmission even when no UEs are receiving services. When the gNB recognizes interest of the UE in the idle/inactive state, such unnecessary PTM transmission needs to be avoided. Conversely, when the PTM stops while the UEs in the idle/inactive state receiving services are still present, many UEs may simultaneously request connection, which is also undesirable.

Accordingly, it is worthwhile to study whether to introduce a mechanism for collecting the UE assistance information, specifically the MBMS counting, from the UE in the idle/inactive state. Needless to say, it is desirable that the UEs in the idle/inactive state be capable of reporting information without transitioning to the RRC connected state. For example, this may be achieved when the PRACH resource partitioning associated with the MBS service is introduced to such a report.

It is noted that no MCE is present in the NR MBS. This means that the MCE function is integrated in the gNB. In this sense, it is RAN3 that determines whether the counting is required in the NRMBS, regardless of what RAN2 has determined from the viewpoint of the network interface.

Proposal 9: RAN2 needs to discuss whether the MBS counting is introduced and also collected from the UE in the idle/inactive state.

The invention claimed is:

1. A communication control method used in a mobile communication system providing a multicast broadcast service (MBS) from a base station to a user equipment, the communication control method comprising:

by the user equipment, specifying a broadcast session among MBS sessions in which the user equipment is interested, the broadcast session being an MBS session transmitted in a broadcast manner;

by the user equipment, transmitting, to the base station, an MBS interest notification comprising identification information identifying the broadcast session specified;

by the user equipment, receiving, first information for the broadcast session through an MBS control channel; and by the user equipment, receiving, second information for a multicast session through unicast RRC signaling, wherein the specifying comprises specifying the broadcast session based on information received through the MBS control channel.

2. The communication control method according to claim 1, wherein the specifying comprises specifying the broadcast session based on broadcast session identification information received from the base station.

3. The communication control method according to claim 1, wherein the specifying comprises by an RRC layer of the user equipment, acquiring identification information from an upper layer above the RRC layer in the user equipment, and by the RRC layer, specifying the broadcast session based on the identification information, and the identification information identifies the broadcast session specified by the upper layer.

4. The communication control method according to claim 3, wherein the upper layer is a NAS layer or an application layer.

5. The communication control method according to claim 1, wherein the specifying comprises by an RRC layer of the user equipment, acquiring identification information from a NAS layer of the user equipment, and by the RRC layer, performing specification as the broadcast session based on the identification information, and the identification information identifies an MBS session for which a session join procedure has completed.

6. The communication control method according to claim 1, wherein the identification information identifies the multicast session in which the user equipment is interested is notified from a core network apparatus to the base station.

7. A user equipment communicating with a base station providing a multicast broadcast service (MBS), comprising a controller configured to specify a broadcast session among MBS sessions in which the user equipment is interested, the broadcast session being an MBS session transmitted in a broadcast manner, a transmitter configured to transmit, to the base station, an MBS interest notification comprising identification information identifying the broadcast session specified;

a receiver configured to receive, first information for the broadcast session through an MBS control channel, and second information for a multicast session through unicast RRC signaling, wherein the controller is configured to specify the broadcast session based on information received through the MBS control channel.

8. An apparatus configured to control a user equipment communicating with a base station providing a multicast broadcast service (MBS), the apparatus comprises a processor and a memory, the processor is configured to specify a broadcast session among MBS sessions in which the user equipment is interested, the broadcast session being an MBS session transmitted in a broadcast manner;

transmit, to the base station, an MBS interest notification comprising identification information identifying the broadcast session specified;

receive, from the base station, first information for the broadcast session through an MBS control channel; and receive, from the base station, second information for a multicast session through unicast RRC signaling, wherein the processor is configured to specify the broadcast session based on information received through the MBS control channel.

* * * * *